US012060054B2

(12) United States Patent
Furuhata et al.

(10) Patent No.: US 12,060,054 B2
(45) Date of Patent: Aug. 13, 2024

(54) VEHICLE CONTROL DEVICE

(71) Applicant: HONDA MOTOR CO., LTD., Tokyo (JP)

(72) Inventors: Taisuke Furuhata, Tokyo (JP); Masashi Eto, Tokyo (JP); Tatsuya Ide, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 304 days.

(21) Appl. No.: 17/583,851

(22) Filed: Jan. 25, 2022

(65) Prior Publication Data
US 2022/0258724 A1    Aug. 18, 2022

(30) Foreign Application Priority Data

Feb. 12, 2021    (JP) ................................ 2021-020995

(51) Int. Cl.
*B60W 20/20*    (2016.01)
*B60K 6/442*    (2007.10)
(Continued)

(52) U.S. Cl.
CPC ............. *B60W 20/20* (2013.01); *B60K 6/442* (2013.01); *B60W 10/02* (2013.01); *B60W 10/06* (2013.01);
(Continued)

(58) Field of Classification Search
USPC ........................................................ 701/22
See application file for complete search history.

(56) References Cited

U.S. PATENT DOCUMENTS 9,376,103 B2 *  6/2016  Ueda .................... B60W 10/26
2012/0253576 A1  10/2012  Tamagawa
(Continued)

FOREIGN PATENT DOCUMENTS

CN          102666234 A     9/2012
JP        2013-249031 A    12/2013
(Continued)

OTHER PUBLICATIONS

Translation of Feb. 20, 2023, Chinese Office Action issued for related CN Application No. 202210131460.2.
(Continued)

*Primary Examiner* — Marc Burgess
*Assistant Examiner* — Michael Tyler Evan Dowling
(74) *Attorney, Agent, or Firm* — Paratus Law Group, PLLC

(57) ABSTRACT

A vehicle control device that controls a vehicle which is capable of traveling in a plurality of traveling modes including a first traveling mode and a second traveling mode. And the vehicle control device is capable of executing motor assist, in which electric power of a power storage device is supplied to an electric motor and driving of a drive wheel is assisted by the electric motor, when the vehicle is traveling in the first traveling mode, and is configured to change upper-limit assist electric power, which is an upper-limit value of electric power supplied from the power storage device to the electric motor in order to perform the motor assist, in accordance with a speed of the vehicle and a remaining capacity of the power storage device.

2 Claims, 4 Drawing Sheets

(51) Int. Cl.
*B60W 10/02* (2006.01)
*B60W 10/06* (2006.01)
*B60W 10/08* (2006.01)
*B60W 20/15* (2016.01)

(52) U.S. Cl.
CPC ............ *B60W 10/08* (2013.01); *B60W 20/15* (2016.01); *B60W 2510/0638* (2013.01); *B60W 2510/085* (2013.01); *B60W 2510/244* (2013.01); *B60W 2520/10* (2013.01); *B60W 2520/12* (2013.01)

(56) References Cited

U.S. PATENT DOCUMENTS

| | | | |
|---|---|---|---|
| 2014/0012450 A1* | 1/2014 | Laing | B60W 30/18027 180/65.265 |
| 2014/0088807 A1* | 3/2014 | Saito | B60W 30/1882 180/65.265 |
| 2014/0330467 A1 | 11/2014 | Tamagawa | |
| 2015/0006000 A1* | 1/2015 | Kawata | B60W 20/30 180/65.265 |
| 2016/0137182 A1* | 5/2016 | Johri | F16H 61/16 180/65.265 |
| 2020/0122712 A1 | 4/2020 | Miki et al. | |
| 2021/0188280 A1 | 6/2021 | Abe et al. | |

FOREIGN PATENT DOCUMENTS

| | | |
|---|---|---|
| JP | 2016-144316 A | 8/2016 |
| JP | 2017-095098 A | 6/2017 |
| JP | 2017-100471 A | 6/2017 |
| WO | WO 2019/003443 A1 | 1/2019 |
| WO | WO 2019/111459 A1 | 6/2019 |
| WO | WO 2020/148975 A1 | 7/2020 |
| WO | WO-2020148975 A1 * | 7/2020 |

OTHER PUBLICATIONS

Sep. 6, 2022, Japanese Office Action issued for related JP Application No. 2021-020995.

Nov. 15, 2023, translation of Chinese Office Action issued for related CN Application No. 202210131460.2.

* cited by examiner

FIG. 2

| TRAVELING MODE | FIRST CLUTCH | SECOND CLUTCH | ENGINE | MOTOR | GENERATOR |
|---|---|---|---|---|---|
| EV TRAVELING MODE | DISENGAGE | DISENGAGE | STOP POWER OUTPUT | HYBRID DRIVE | STOP POWER GENERATION |
| HYBRID TRAVELING MODE | DISENGAGE | DISENGAGE | OUTPUT POWER | GENERATOR DRIVE | GENERATE POWER |
| LOW-SPEED SIDE ENGINE TRAVELING MODE | ENGAGE | DISENGAGE | OUTPUT POWER | OUTPUT POWER AS NECESSARY | STOP POWER GENERATION |
| HIGH-SPEED SIDE ENGINE TRAVELING MODE | DISENGAGE | ENGAGE | OUTPUT POWER | OUTPUT POWER AS NECESSARY | STOP POWER GENERATION |

VEHICLE CONTROL DEVICE

CROSS-REFERENCE TO RELATED APPLICATIONS

This application is based on and claims priority under 35 USC 119 from Japanese Patent Application No. 2021-020995 filed on Feb. 12, 2021, the contents of which are incorporated herein by reference.

TECHNICAL FIELD

The present invention relates to a vehicle control device.

BACKGROUND

In recent years, a hybrid electric vehicle including an internal combustion engine and an electric motor has been developed. There are roughly two types of hybrid electric vehicles, that is, a series type and a parallel type. In a series type hybrid electric vehicle, a generator is driven by an internal combustion engine, the generated electric power is supplied to an electric motor, and drive wheels are driven by the electric motor, thereby causing the vehicle to travel. In a parallel type hybrid electric vehicle, drive wheels are driven by power of at least one of an internal combustion engine and an electric motor, thereby causing the vehicle to travel.

A hybrid electric vehicle capable of switching between a series type and a parallel type is also known (for example, see international patent publication No. WO2019/003443). In a hybrid electric vehicle capable of switching between a series type and a parallel type, a power transmission system is switched to any one of a configuration of a series type and a parallel type by disengaging or engaging a clutch (connecting-disconnecting part).

In some hybrid electric vehicles in recent years, electric power of a power storage device is supplied to an electric motor to assist traveling of the vehicle with power output from the electric motor. Further, there is also a device that restricts execution of such assist based on a charge amount of a power storage device that supplies electric power to an electric motor (for example, see JP-A-2016-144316).

In a vehicle including an internal combustion engine and an electric motor, improvement in fuel efficiency is desired. As a method for improving the fuel efficiency of such a vehicle, it is conceivable to efficiently use power of the internal combustion engine.

For example, in parallel traveling in which drive wheels are driven by the internal combustion engine to cause the vehicle to travel, the power of the internal combustion engine can be used as it is as power for causing the vehicle to travel.

On the other hand, in series traveling in which a generator is driven by the internal combustion engine, generated electric power is supplied to the electric motor, and the drive wheels are driven by the electric motor to cause the vehicle to travel, the power of the internal combustion engine is converted into electric power and used for traveling of the vehicle. Accordingly, the power of the internal combustion engine can be used more efficiently with a low loss in the parallel traveling than in the series traveling. Accordingly, it is considered that the fuel efficiency can be improved if it is possible to increase opportunities of performing parallel traveling in which the drive wheels are driven by the internal combustion engine.

Meanwhile, in a vehicle capable of series traveling and parallel traveling, there is a tendency that a large driving force is more easily obtained in series traveling than in parallel traveling. Accordingly, in such a vehicle, for example, when a required driving force required to cause the vehicle to travel cannot be secured by the parallel traveling during the parallel traveling, switching to the series traveling is performed. Generally, switching from the series traveling to the parallel traveling is accompanied by a change in a rotation speed of the internal combustion engine, and if the rotation speed of the internal combustion engine increases greatly at this time, noise vibration (NV) characteristics of the vehicle deteriorate.

The present invention provides a vehicle control device capable of improving fuel efficiency while suppressing deterioration of NV characteristics of a vehicle.

SUMMARY

The present invention provides a vehicle control device that controls a vehicle, the vehicle including: an internal combustion engine; a generator that is driven by the internal combustion engine; a power storage device; an electric motor that performs driving by use of supply of electric power from at least one of the generator and the power storage device; a drive wheel that is driven by at least one of the internal combustion engine and the electric motor; and a connecting-disconnecting part that connects and disconnects a power transmission path between the internal combustion engine and the drive wheel, in which the vehicle is capable of traveling in a plurality of traveling modes including
  a first traveling mode in which the power transmission path is connected by the connecting-disconnecting part and at least the internal combustion engine drives the drive wheel to cause the vehicle to travel, and
  a second traveling mode in which the power transmission path is disconnected by the connecting-disconnecting part and the electric motor drives the drive wheel by use of supply of electric power from at least the generator to cause the vehicle to travel, and
in which the vehicle control device
  is capable of executing motor assist, in which electric power of the power storage device is supplied to the electric motor and driving of the drive wheel is assisted by the electric motor, when the vehicle is traveling in the first traveling mode, and
  is configured to change upper-limit assist electric power, which is an upper-limit value of electric power supplied from the power storage device to the electric motor in order to perform the motor assist, in accordance with a speed of the vehicle and a remaining capacity of the power storage device.

According to the present invention, it is possible to provide a vehicle control device capable of improving fuel efficiency while suppressing deterioration of NV characteristics of a vehicle.

BRIEF DESCRIPTION OF DRAWINGS

Exemplary embodiments of the present invention will be described in detail based on the following figures, wherein:

FIG. 2 is a table illustrating contents of traveling modes;

DESCRIPTION OF EMBODIMENTS

Hereinafter, an embodiment of a vehicle control device of the present invention will be described in detail with reference to the drawings.

Figure 1:
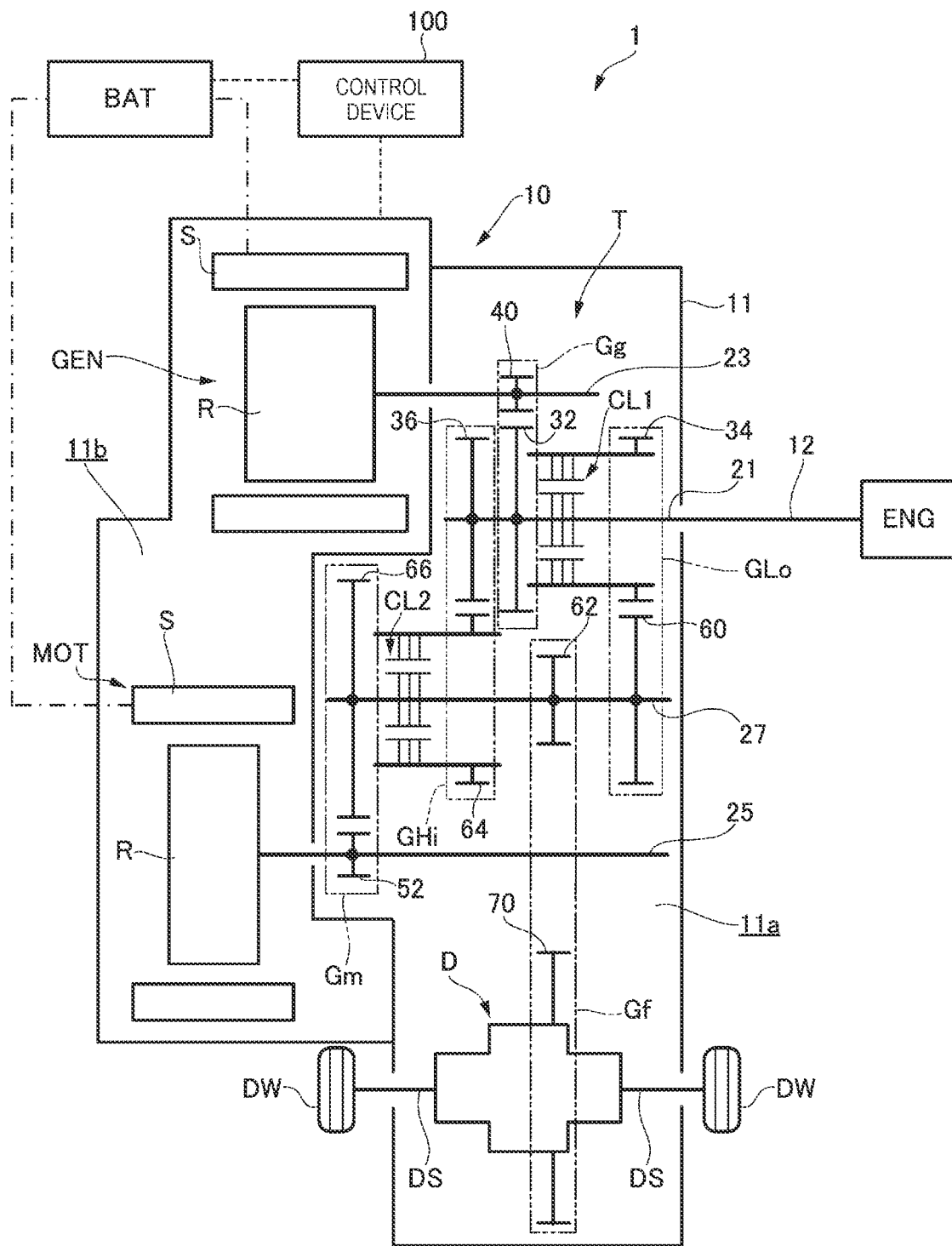
FIG. 1 is a diagram illustrating a schematic configuration of a vehicle including a vehicle control device according to an embodiment of the present invention.

First, a vehicle 1 including a control device 100 according to an embodiment of a vehicle control device of the present invention will be described with reference to FIG. 1. As illustrated in FIG. 1, the vehicle 1 of the present embodiment includes a drive device 10 that outputs a driving force of the vehicle 1, and the control device 100 that performs control of the entire vehicle 1 including the drive device 10.

[Drive Device]

As illustrated in FIG. 1, the drive device 10 includes an engine ENG that is an example of an internal combustion engine according to the present invention, a generator GEN that is an example of a generator according to the present invention, a motor MOT that is an example of an electric motor according to the present invention, a transmission T, and a case 11 that accommodates the generator GEN, the motor MOT, and the transmission T. The motor MOT and the generator GEN are connected to a battery BAT provided in the vehicle 1, and power supply from the battery BAT and energy regeneration to the battery BAT are possible. The battery BAT is an example of a power storage device according to the present invention.

[Transmission]

The case 11 is provided with, from the engine ENG side along an axial direction, a transmission accommodation chamber 11a that accommodates the transmission T and a motor accommodation chamber 11b that accommodates the motor MOT and the generator GEN.

The transmission accommodation chamber 11a accommodates an input shaft 21, a generator shaft 23, a motor shaft 25, and a counter shaft 27, which are disposed parallel to one another, and a differential mechanism D.

The input shaft 21 is disposed side by side and coaxially with a crankshaft 12 of the engine ENG. Driving force of the crankshaft 12 is transmitted to the input shaft 21 via a damper (not shown). On the input shaft 21, a generator drive gear 32 constituting a generator gear train Gg is provided.

On the input shaft 21, a low-speed side drive gear 34 constituting a low-speed side engine gear train GLo is provided via a first clutch CL1 on an engine side with respect to the generator drive gear 32, and a high-speed side drive gear 36 constituting a high-speed side engine gear train GHi is provided on a side opposite to the engine side (hereinafter referred to as a motor side). The first clutch CL1 is a hydraulic clutch capable of engaging and disengaging the input shaft 21 with and from the low-speed side drive gear 34, and is a so-called multi-plate friction clutch.

The generator shaft 23 is provided with a generator driven gear 40 that meshes with the generator drive gear 32. The generator drive gear 32 of the input shaft 21 and the generator driven gear 40 of the generator shaft 23 constitute the generator gear train Gg for transmitting rotation of the input shaft 21 to the generator shaft 23. On the motor side of the generator shaft 23, the generator GEN is disposed. The generator GEN is configured to include a rotor R that is fixed to the generator shaft 23, and a stator S that is fixed to the case 11 and disposed on an outer diameter side of the rotor R so as to face the rotor R.

When the rotation of the input shaft 21 is transmitted to the generator shaft 23 via the generator gear train Gg, the rotor R of the generator GEN is rotated by the rotation of the generator shaft 23. Thus, at the time of driving of the engine ENG, power of the engine ENG input from the input shaft 21 can be converted into electric power by the generator GEN.

The motor shaft 25 is provided with a motor drive gear 52 constituting a motor gear train Gm. On the motor shaft 25, the motor MOT is disposed on the motor side with respect to the motor drive gear 52. The motor MOT includes a rotor R that is fixed to the motor shaft 25, and a stator S that is fixed to the case 11 and disposed on an outer diameter side of the rotor R so as to face the rotor R.

The counter shaft 27 is provided with, in an order from the engine side, a low-speed side driven gear 60 that meshes with the low-speed side drive gear 34, an output gear 62 that meshes with a ring gear 70 of the differential mechanism D, a high-speed side driven gear 64 that meshes with the high-speed side drive gear 36 of the input shaft 21 via a second clutch CL2, and a motor driven gear 66 that meshes with the motor drive gear 52 of the motor shaft 25. The second clutch CL2 is a hydraulic clutch capable of engaging and disengaging the counter shaft 27 with and from the high-speed side driven gear 64, and is a so-called multi-plate friction clutch.

The low-speed side drive gear 34 of the input shaft 21 and the low-speed side driven gear 60 of the counter shaft 27 constitute the low-speed side engine gear train GLo for transmitting the rotation of the input shaft 21 to the counter shaft 27. The high-speed side drive gear 36 of the input shaft 21 and the high-speed side driven gear 64 of the counter shaft 27 constitute the high-speed side engine gear train GHi for transmitting the rotation of the input shaft 21 to the counter shaft 27. Here, the low-speed side engine gear train GLo including the low-speed side drive gear 34 and the low-speed side driven gear 60 has a larger reduction ratio than the high-speed side engine gear train GHi including the high-speed side drive gear 36 and the high-speed side driven gear 64.

Accordingly, when the first clutch CL1 is engaged and the second clutch CL2 is disengaged at the time of driving of the engine ENG, a driving force of the engine ENG is transmitted to the counter shaft 27 via the low-speed side engine gear train GLo at a large reduction ratio. On the other hand, when the first clutch CL1 is disengaged and the second clutch CL2 is engaged at the time of driving of the engine ENG, the driving force of the engine ENG is transmitted to the counter shaft 27 via the high-speed side engine gear train GHi at a small reduction ratio. Note that there is no occurrence that the first clutch CL1 and the second clutch CL2 are engaged at the same time.

The motor drive gear 52 of the motor shaft 25 and the motor driven gear 66 of the counter shaft 27 constitute the motor gear train Gm for transmitting rotation of the motor shaft 25 to the counter shaft 27. When the rotor R of the motor MOT is rotated, the rotation of the motor shaft 25 is transmitted to the counter shaft 27 via the motor gear train Gm. Accordingly, at the time of driving of the motor MOT, a driving force of the motor MOT is transmitted to the counter shaft 27 via the motor gear train Gm.

The output gear 62 of the counter shaft 27 and the ring gear 70 of the differential mechanism D constitute a final gear train Gf for transmitting rotation of the counter shaft 27 to the differential mechanism D. Accordingly, the driving force of the motor MOT input to the counter shaft 27 via the motor gear train Gm, the driving force of the engine ENG input to the counter shaft 27 via the low-speed side engine gear train GLo, and the driving force of the engine ENG input to the counter shaft 27 via the high-speed side engine gear train GHi are transmitted to the differential mechanism D via the final gear train Gf and transmitted from the differential mechanism D to an axle DS. As a result, a driving force for causing the vehicle 1 to travel is output via a pair of drive wheels DW provided at both ends of the axle DS.

The drive device 10 configured as described above has a power transmission path for transmitting the driving force of the motor MOT to the axle DS (that is, the drive wheels DW), a low-speed side power transmission path for transmitting the driving force of the engine ENG to the axle DS, and a high-speed side power transmission path for transmitting the driving force of the engine ENG to the axle DS. Thus, as will be described later, the vehicle 1 equipped with the drive device 10 can take a plurality of traveling modes such as an EV traveling mode or a hybrid traveling mode in which the vehicle travels by power output from the motor MOT, and a low-speed side engine traveling mode or a high-speed side engine traveling mode in which the vehicle travels by power output from the engine ENG.

The control device 100 acquires vehicle information related to the vehicle 1 based on detection signals received from various sensors provided in the vehicle 1, and controls the drive device 10 based on the acquired vehicle information. Examples of the sensors provided in the vehicle 1 include a vehicle speed sensor that detects a rotation speed of the axle DS, an accelerator position sensor (hereinafter, also referred to as an AP sensor) that detects an operation amount with respect to an accelerator pedal of the vehicle 1, a brake sensor that detects an operation amount with respect to a brake pedal of the vehicle 1, an engine rotation speed sensor that detects a rotation speed of the engine ENG (hereinafter, also referred to as an engine rotation speed), and a battery sensor that detects a state of the battery BAT (for example, a voltage between terminals, a charging/discharging current, and a temperature of the battery BAT).

The vehicle information includes information indicating a traveling state of the vehicle 1. Examples of the traveling state of the vehicle 1 include a speed of the vehicle 1 (hereinafter, also referred to as a vehicle speed), an AP opening degree indicating an operation amount (that is, an accelerator position) with respect to the accelerator pedal provided in the vehicle 1, a driving force required for traveling of the vehicle 1 (hereinafter, also referred to as a required driving force), and an engine rotation speed.

The vehicle speed can be acquired based on a detection signal from the vehicle speed sensor. The AP opening degree can be acquired based on a detection signal from the AP sensor. The engine rotation speed can be acquired based on a detection signal from the engine rotation speed sensor. The required driving force can be derived based on the vehicle speed, the AP opening degree, or the like.

The vehicle information further includes battery information related to the battery BAT provided in the vehicle 1. The battery information includes information indicating a state of charge (SOC) that is a remaining capacity of the battery BAT The SOC of the battery BAT is hereinafter also referred to as a battery SOC. The battery SOC can be derived based on a detection signal (for example, a voltage between terminals or a charging/discharging current of the battery BAT) from the battery sensor. In addition, the battery information may include information such as a voltage between terminals, a charging/discharging current, and a temperature of the battery BAT detected by the battery sensor.

The control device 100 controls the drive device 10 based on the vehicle information (that is, the traveling state of the vehicle 1 and the battery information) to cause the vehicle 1 to travel in one of the plurality of traveling modes (to be described later) that the vehicle 1 can take. In controlling the drive device 10, for example, the control device 100 controls the driving of the engine ENG by controlling supply of fuel to the engine ENG, controls the driving of the motor MOT by controlling supply of electric power from the generator GEN or the battery BAT to the motor MOT, and controls power generation of the generator GEN by controlling a field current or the like flowing through coils of the generator GEN.

Further, in controlling the drive device 10, the control device 100 controls an actuator (not shown), which operates the first clutch CL1, to engage or disengage the first clutch CL1. Similarly, the control device 100 controls an actuator (not shown), which operates the second clutch CL2, to engage or disengage the second clutch CL2.

In this way, the control device 100 controls the engine ENG, the generator GEN, the motor MOT, the first clutch CL1, and the second clutch CL2, thereby enabling the vehicle 1 to travel in any one of a plurality of traveling modes to be described later. Note that the control device 100 is implemented with, for example, an electronic control unit (ECU) that includes a processor, a memory, an interface, and the like.

[Traveling Modes That Vehicle Can Take]

Next, traveling modes that can be taken by the vehicle 1 will be described with reference to a traveling mode table Ta illustrated in FIG. 2. As illustrated in FIG. 2, the vehicle 1 can take an EV traveling mode, a hybrid traveling mode, a low-speed side engine traveling mode, and a high-speed side engine traveling mode.

[EV Traveling Mode]

The EV traveling mode is a traveling mode in which electric power is supplied from the battery BAT to the motor MOT and the vehicle 1 is caused to travel by power output from the motor MOT based on the electric power.

Specifically, in the case of the EV traveling mode, the control device 100 disengages both the first clutch CL1 and the second clutch CL2. In addition, in the case of the EV traveling mode, the control device 100 stops fuel injection to the engine ENG to stop the output of the power from the engine ENG. Further, in the case of the EV traveling mode, the control device 100 supplies electric power from the battery BAT to the motor MOT, and causes the motor MOT to output power corresponding to the electric power (illustrated as "battery drive" of motor). Thus, in the EV traveling mode, the vehicle 1 travels by the power output from the motor MOT based on the electric power supplied from the battery BAT.

In the EV traveling mode, as described above, output of power from the engine ENG is stopped, and both the first clutch CL1 and the second clutch CL2 are disengaged. Accordingly, in the EV traveling mode, power is not input to the generator GEN, and power generation by the generator GEN is not performed (illustrated as "power generation stop" of generator).

[Hybrid Traveling Mode]

The hybrid traveling mode is a traveling mode in which electric power is supplied from at least the generator GEN to the motor MOT, and the vehicle 1 is caused to travel by power output from the motor MOT based on the electric power. This hybrid traveling mode is an example of a second traveling mode in the present invention.

Specifically, in the case of the hybrid traveling mode, the control device 100 disengages both the first clutch CL1 and the second clutch CL2. In addition, in the case of the hybrid traveling mode, the control device 100 performs fuel injection to the engine ENG to output power from the engine ENG. The power output from the engine ENG is input to the generator GEN via the generator gear train Gg. Accordingly, power generation by the generator GEN is performed.

Further, in the case of the hybrid traveling mode, the control device 100 supplies electric power generated by the generator GEN to the motor MOT, and causes the motor MOT to output power corresponding to the electric power (illustrated as "generator drive" of motor). The electric power supplied from the generator GEN to the motor MOT is larger than the electric power supplied from the battery BAT to the motor MOT. Accordingly, in the hybrid traveling mode, the power output from the motor MOT (the driving force of the motor MOT) can be increased as compared with the EV traveling mode, and a large driving force can be obtained as a driving force of the vehicle 1.

In the case of the hybrid traveling mode, the control device 100 can also supply electric power from the battery BAT to the motor MOT as necessary. That is, the control device 100 can supply electric power to the motor MOT from both the generator GEN and the battery BAT in the hybrid traveling mode. Accordingly, since the electric power supplied to the motor MOT can be increased as compared with that in the case where the electric power is supplied to the motor MOT only by the generator GEN, the power output from the motor MOT can be further increased, and a larger driving force can be obtained as the driving force of the vehicle 1.

[Low-Speed Side Engine Traveling Mode]

The low-speed side engine traveling mode is a traveling mode in which the vehicle 1 is caused to travel by transmitting power output from the engine ENG to the drive wheels DW through the low-speed side power transmission path.

Specifically, in the case of the low-speed side engine traveling mode, the control device 100 performs fuel injection to the engine ENG to output power from the engine ENG. In addition, in the case of the low-speed side engine traveling mode, the control device 100 engages the first clutch CL1 and disengages the second clutch CL2. Accordingly, in the low-speed side engine traveling mode, the power output from the engine ENG is transmitted to the drive wheels DW via the low-speed side engine gear train GLo, the final gear train Gf, and the differential mechanism D to cause the vehicle 1 to travel.

In addition, in the case of the low-speed side engine traveling mode, the power output from the engine ENG is also input to the generator GEN via the generator gear train Gg, but power generation by the generator GEN is controlled so as not to be performed. For example, in the low-speed side engine traveling mode, a switching element provided in an electric-power transmission path between the generator GEN and the battery BAT (for example, a switching element of an inverter device provided between the generator GEN and the battery BAT) is turned off, so that the power generation by the generator GEN is controlled so as not to be performed. Accordingly, in the low-speed side engine traveling mode, it is possible to reduce a loss caused by the generator GEN performing power generation, and to reduce an amount of heat generated by the generator GEN and the like. In addition, in the low-speed side engine traveling mode, when the vehicle 1 is braked, regenerative power generation may be performed by the motor MOT, and the battery BAT may be charged with the generated electric power.

In addition, in the case of the low-speed side engine traveling mode, the control device 100 can supply electric power from the battery BAT to the motor MOT as necessary. Accordingly, in the low-speed side engine traveling mode, the vehicle 1 can be caused to travel also using the power output from the motor MOT based on the electric power supplied from the battery BAT, and a larger driving force can be obtained as the driving force of the vehicle 1 as compared with that in a case where the vehicle 1 is caused to travel only by the power of the engine ENG.

[High-Speed Side Engine Traveling Mode]

The high-speed side engine traveling mode is a traveling mode in which the vehicle 1 is caused to travel by transmitting power output from the engine ENG to the drive wheels DW through the high-speed side power transmission path. The high-speed side engine traveling mode is an example of a first traveling mode according to the present invention.

Specifically, in the case of the high-speed side engine traveling mode, the control device 100 performs fuel injection to the engine ENG to output power from the engine ENG. In addition, in the case of the high-speed side engine traveling mode, the control device 100 engages the second clutch CL2 and disengages the first clutch CL1. Accordingly, in the high-speed side engine traveling mode, the power output from the engine ENG is transmitted to the drive wheels DW via the high-speed side engine gear train GHi, the final gear train Gf, and the differential mechanism D to cause the vehicle 1 to travel.

In addition, in the case of the high-speed side engine traveling mode, the power output from the engine ENG is also input to the generator GEN via the generator gear train Gg, but power generation by the generator GEN is controlled so as not to be performed. Accordingly, in the high-speed side engine traveling mode, it is possible to reduce a loss caused by the generator GEN performing power generation, and to reduce an amount of heat generated by the generator GEN and the like. In addition, in the high-speed side engine traveling mode, when the vehicle 1 is braked, regenerative power generation may be performed by the motor MOT, and the battery BAT may be charged with the generated electric power.

In addition, in the high-speed side engine traveling mode, the control device 100 can supply electric power from the battery BAT to the motor MOT as necessary. Accordingly, in the high-speed side engine traveling mode, the vehicle 1 can be caused to travel also using the power output from the motor MOT based on the electric power supplied from the battery BAT, and a larger driving force can be obtained as the driving force of the vehicle 1 as compared with that in the case where the vehicle 1 is caused to travel only by the power of the engine ENG.

In the low-speed side engine traveling mode and the high-speed side engine traveling mode, use of the power output from the motor MOT by supplying electric power from the battery BAT to the motor MOT for traveling of the vehicle 1 is hereinafter also referred to as motor assist.

[Example of Case in Which Traveling is Performed in Each of High-Speed Side Engine Traveling Mode and Hybrid Traveling Mode]

Here, an example in which the control device 100 causes the vehicle 1 to travel in each of the high-speed side engine traveling mode and the hybrid traveling mode will be described. In the following description, an upper-limit value of the driving force of the vehicle 1 is also referred to as a maximum driving force.

In the vehicle 1, a maximum driving force in the hybrid traveling mode is larger than a maximum driving force in the high-speed side engine traveling mode. On the other hand, in the high-speed side engine traveling mode, the power of the engine ENG is used as it is as the power for causing the vehicle 1 to travel, and thus the power of the engine ENG can be efficiently used with a low loss as compared with the hybrid traveling mode in which the power of the engine ENG is converted into electric power by the generator GEN and used for the traveling of the vehicle 1.

In view of the characteristics of the hybrid traveling mode and the high-speed side engine traveling mode, when the vehicle 1 travels at a high speed equal to or higher than a predetermined speed vth (for example, 60 [km/h]), the control device 100 causes the vehicle 1 to travel in the high-speed side engine traveling mode if a required driving force is equal to or lower than the maximum driving force in the high-speed side engine traveling mode. Further, when the required driving force exceeds the maximum driving force in the high-speed side engine traveling mode, the control device 100 shifts the traveling mode to the hybrid traveling mode. Accordingly, the control device 100 can cause the vehicle 1 to travel by efficiently using the power of the engine ENG, and it is possible to improve the fuel efficiency of the vehicle 1.

The maximum driving force in the high-speed side engine traveling mode is a sum of an upper-limit value of a driving force that can be output by the engine ENG (LU upper-limit engine torque to be described later) and a driving force that can be output by the motor MOT by motor assist (hereinafter also referred to as an upper-limit assist torque) in the high-speed side engine traveling mode.

Therefore, if the upper-limit assist torque is increased, the maximum driving force in the high-speed side engine traveling mode can also be increased. When the maximum driving force in the high-speed side engine traveling mode is increased, the high-speed side engine traveling mode can be maintained more easily, for example, even if the required driving force is increased in response to an acceleration request from a driver, as compared with a case where the maximum driving force in the high-speed side engine traveling mode is small. That is, when the maximum driving force in the high-speed side engine traveling mode is increased, it is possible to easily maintain the high-speed side engine traveling mode while securing acceleration performance for quickly accelerating the vehicle 1 in response to the acceleration request from the driver. When the high-speed side engine traveling mode is easily maintained as described above, opportunities for the vehicle 1 to travel in the high-speed side engine traveling mode can be increased, and thus the fuel efficiency of the vehicle 1 can be improved.

On the other hand, when the maximum driving force in the high-speed side engine traveling mode is increased, the required driving force at the time when transition from the high-speed side engine traveling mode to the hybrid traveling mode is performed is also increased accordingly.

It is assumed that, when the required driving force is large and the battery SOC is low, the transition from the high-speed side engine traveling mode to the hybrid traveling mode is performed. In this case, the motor MOT requires a large amount of electric power accompanying the transition to the hybrid traveling mode, but when the battery SOC is low, most of the electric power required by the motor MOT needs to be covered by the power generation of the generator GEN. Accordingly, in order to secure a power generation amount of the generator GEN, the engine rotation speed may be increased greatly. In this way, when the engine rotation speed is greatly increased accompanying the transition from the high-speed side engine traveling mode to the hybrid traveling mode, the NV characteristics of the vehicle 1 deteriorate.

Therefore, the control device 100 configured to be capable of executing the motor assist, in which the electric power of the battery BAT is supplied to the motor MOT and the driving of the drive wheels DW is assisted by the motor MOT, when the vehicle 1 is traveling in the high-speed side engine traveling mode changes upper-limit assist electric power, which is an upper-limit value of electric power supplied from the battery BAT to the motor MOT in order to perform the motor assist, in accordance with a speed of the vehicle 1 (that is, the vehicle speed) and a remaining capacity of the battery BAT (that is, the battery SOC).

The control device 100 can change the upper-limit assist torque (also referred to as an assist amount of motor assist) according to the vehicle speed and the battery SOC by changing the upper-limit assist electric power according to the vehicle speed and the battery SOC. Accordingly, when the battery SOC is low, the control device 100 can reduce the upper-limit assist torque by reducing the upper-limit assist electric power as the vehicle speed increases, and can reduce the maximum driving force in the high-speed side engine traveling mode. Accordingly, when the battery SOC is low, the control device 100 performs the transition from the high-speed side engine traveling mode to the hybrid traveling mode before the speed of the vehicle 1 becomes high (that is, the required driving force becomes large) to some extent, so that it is possible to suppress a large increase in the engine rotation speed (that is, deterioration of the NV characteristics of the vehicle 1) accompanying the transition from the high-speed side engine traveling mode to the hybrid traveling mode.

On the other hand, when the battery SOC is high, the control device 100 can increase the upper-limit assist torque by increasing the upper-limit assist electric power, and can increase the maximum driving force in the high-speed side engine traveling mode. Accordingly, when the battery SOC is high, the control device 100 makes it difficult for the transition from the high-speed side engine traveling mode to the hybrid traveling mode to be performed (that is, makes it easy for the high-speed side engine traveling mode to be maintained), and thus it is possible to improve the fuel efficiency of the vehicle 1.

In this way, the control device 100 can change the upper-limit assist torque (that is, the assist amount) according to the vehicle speed and the battery SOC by changing the upper-limit assist electric power according to the vehicle speed and the battery SOC, thereby improving the fuel efficiency while suppressing the deterioration of the NV characteristics of the vehicle.

Specifically, the control device 100 stores in advance upper-limit assist electric power information indicating upper-limit assist electric power corresponding to vehicle speeds and battery SOCs. When the vehicle 1 is traveling in the high-speed side engine traveling mode, the control device 100 refers to the upper-limit assist electric power information and sets, in the memory or the like, upper-limit assist electric power corresponding to the current vehicle speed and the battery SOC. Further, when it is determined based on a traveling state of the vehicle 1 that the motor assist is to be performed while the vehicle 1 is traveling in the high-speed side engine traveling mode, the control device 100 supplies electric power required for performing the motor assist from the battery BAT to the motor MOT in a range in which the electric power is equal to or less than the set upper-limit assist electric power to perform the motor assist.

[Upper-Limit Assist Electric Power]

Here, an example of upper-limit assist electric power indicated by the upper-limit assist electric power information, that is, an example of upper-limit assist electric power that can be set by the control device 100 will be described with reference to FIG. 3.

Figure 3:
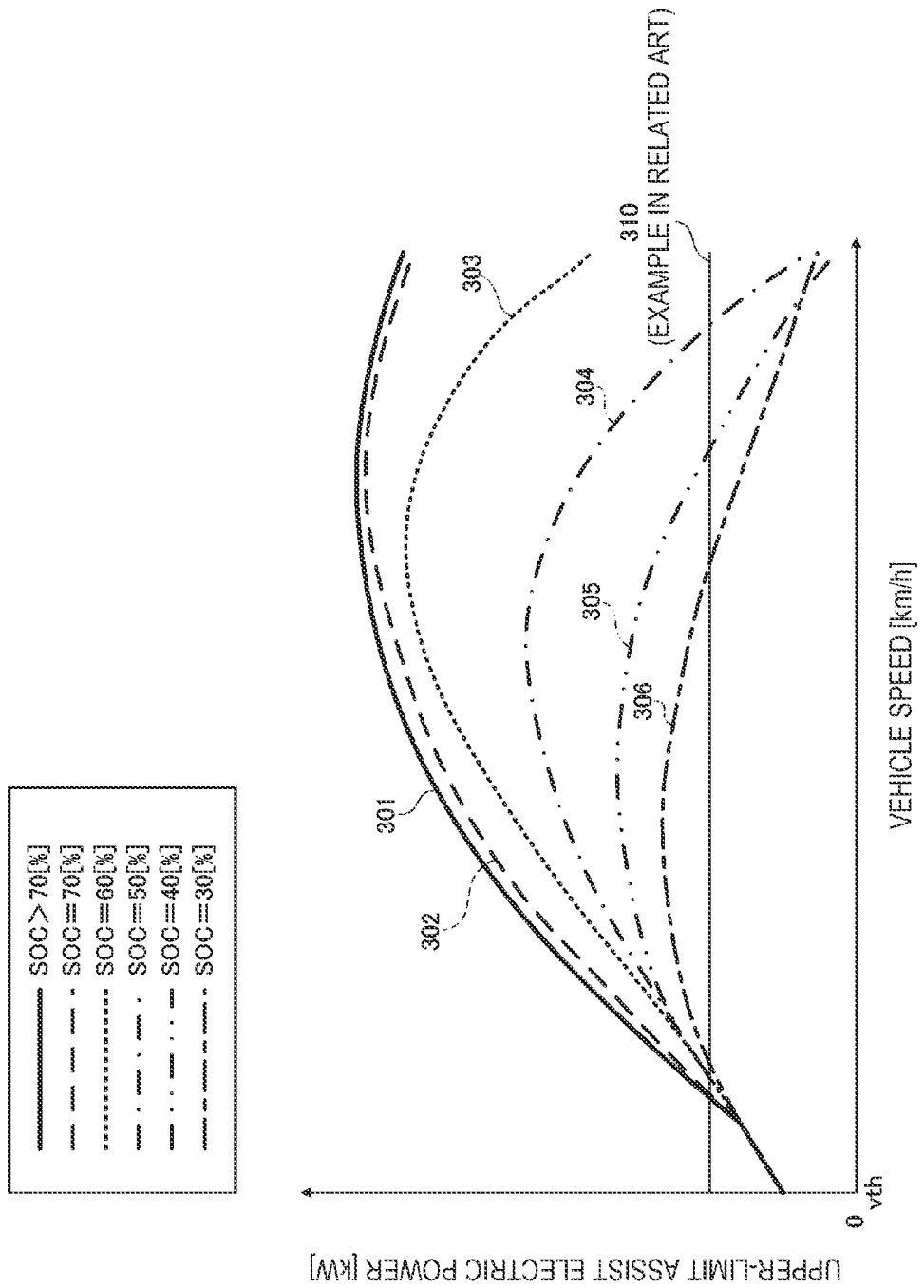
FIG. 3 is a graph illustrating an example of upper-limit assist electric power.

In FIG. 3, upper-limit assist electric power 301 is upper-limit assist electric power corresponding to vehicle speeds equal to or higher than vth (described above) in a case where the battery SOC is higher than 70 [%] (for example, in a case where the battery SOC is 80 [%]). Upper-limit assist electric power 302 is upper-limit assist electric power corresponding to vehicle speeds equal to or higher than vth in a case where the battery SOC is 70 [%]. Upper-limit assist electric power 303 is upper-limit assist electric power corresponding to vehicle speeds equal to or higher than vth in a case where the battery SOC is 60 [%]. Upper-limit assist electric power 304 is upper-limit assist electric power corresponding to vehicle speeds equal to or higher than vth in a case where the battery SOC is 50 [%]. Upper-limit assist electric power 305 is upper-limit assist electric power corresponding to vehicle speeds equal to or higher than vth in a case where the battery SOC is 40 [%]. Upper-limit assist electric power 306 is upper-limit assist electric power corresponding to vehicle speeds equal to or higher than vth in a case where the battery SOC is 30 [%]. In FIG. 3, upper-limit assist electric power 310 is an example of upper-limit assist electric power set in a related-art vehicle (related art) capable of performing motor assist.

As illustrated in FIG. 3, the upper-limit assist electric power (for example, the upper-limit assist electric power 306) in a case where the battery SOC is low is smaller than the upper-limit assist electric power (for example, the upper-limit assist electric power 301) in a case where the battery SOC is high. In other words, the upper-limit assist electric power in the case where the battery SOC is high is larger than the upper-limit assist electric power in the case where the battery SOC is low. Accordingly, the control device 100 can set appropriate upper-limit assist electric power corresponding to the battery SOC. Therefore, as described above, the control device 100 can improve the fuel efficiency while suppressing the deterioration of the NV characteristics of the vehicle.

The upper-limit assist electric power at the time when the vehicle speed is a predetermined speed and the battery SOC is a predetermined amount is determined such that a difference, between an engine rotation speed in a case where the vehicle 1 is caused to travel in the high-speed side engine traveling mode at the predetermined vehicle speed and the predetermined battery SOC and an engine rotation speed in a case where the vehicle 1 is caused to travel in the hybrid traveling mode at the predetermined vehicle speed and the predetermined battery SOC, is equal to or less than a predetermined allowable value allowed from the viewpoint of NV characteristics. Accordingly, even if the transition from the high-speed side engine traveling mode to the hybrid traveling mode occurs, it is possible to suppress an occurrence that the engine rotation speed increases greatly accompanying the transition to an extent that cannot be allowed from the viewpoint of the NV characteristics, causing the deterioration of the NV characteristics of the vehicle 1.

[Transition Timing From High-Speed Side Engine Traveling Mode to Hybrid Traveling Mode]

Next, an example of a transition timing from the high-speed side engine traveling mode to the hybrid traveling mode in the present embodiment and a transition timing from a high-speed side engine traveling mode to a hybrid traveling mode in an example in the related art will be described with reference to FIG. 4. Here, the example of the present embodiment is an example of a case where the upper-limit assist electric power is assumed to be, for example, the upper-limit assist electric power 301, the upper-limit assist electric power 302, or the like illustrated in FIG. 3 because the battery SOC is high to some extent. Here, the example in the related art is an example of a case where the motor assist is performed in the vehicle 1 with the upper-limit assist electric power set to the upper-limit assist electric power 310 illustrated in FIG. 3.

Figure 4:
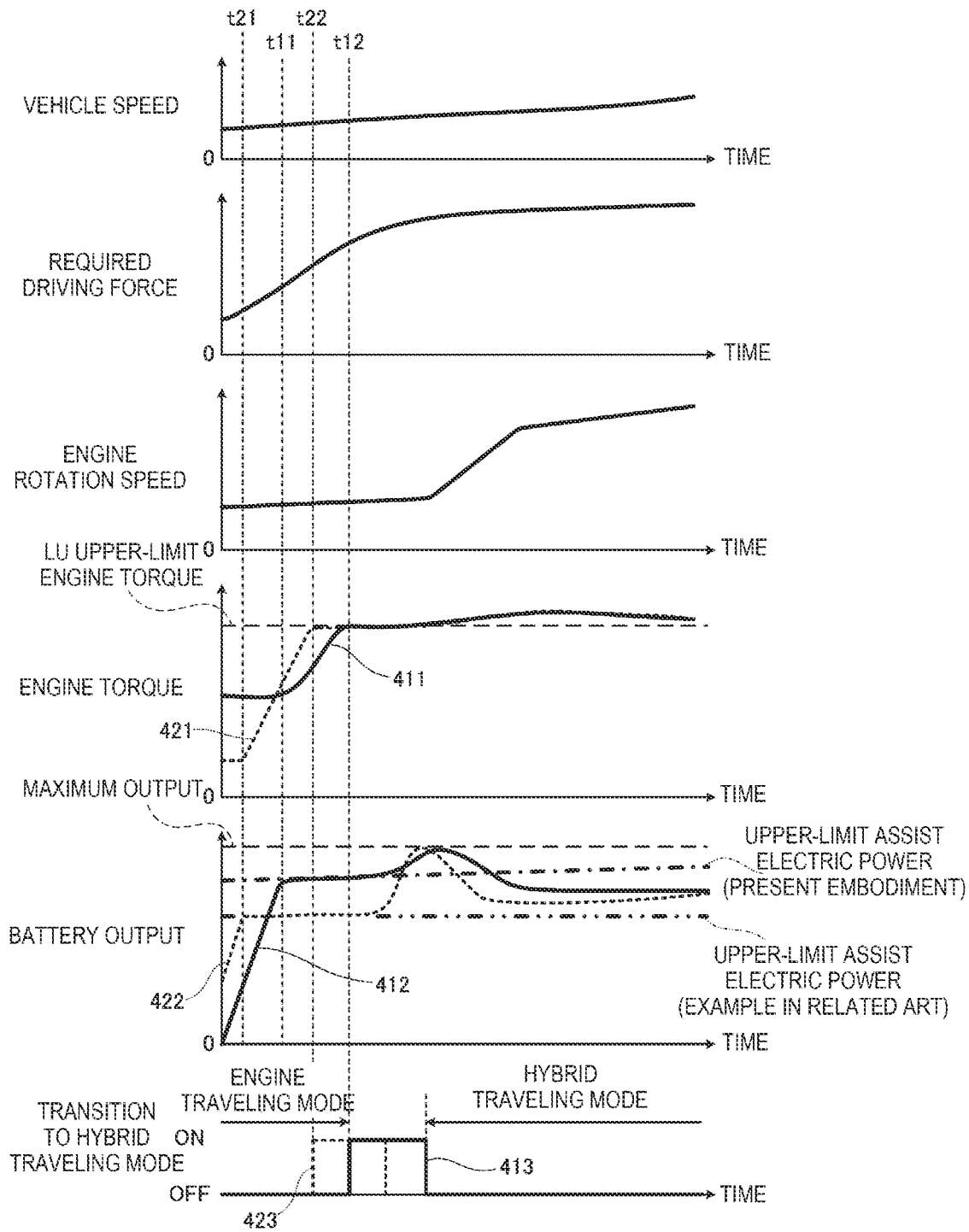
FIG. 4 is a timing chart illustrating transition timings from a high-speed side engine traveling mode to a hybrid traveling mode.

In FIG. 4, a reference sign 411 denotes an engine torque in the present embodiment (that is, a driving force of the engine ENG), and a reference sign 421 denotes an engine torque in the example in the related art. In FIG. 4, a reference sign 412 denotes an output of the battery BAT in the present embodiment, and a reference sign 422 denotes an output of the battery BAT in the example in the related art. Further, in FIG. 4, a reference sign 413 denotes transition from the high-speed side engine traveling mode to the hybrid traveling mode in the present embodiment, and a reference sign 423 denotes transition from the high-speed side engine traveling mode to the hybrid traveling mode in the example in the related art.

First, the example of the present embodiment will be described. As illustrated in FIG. 4, when the required driving force increases while the vehicle 1 is traveling in the high-speed side engine traveling mode, the control device 100 supplies electric power of the battery BAT to the motor MOT to perform the motor assist. Accordingly, the driving force of the vehicle 1 can be increased by a driving force of the motor MOT by the motor assist, without increasing the engine torque (for example, while maintaining the engine torque at a predetermined value) until a time-point t11 when the output of the battery BAT reaches the upper-limit assist electric power.

As illustrated in FIG. 4, the upper-limit assist electric power is smaller than a maximum output of the battery BAT. Accordingly, the battery BAT can output the upper-limit assist electric power as necessary.

Then, when the output of the battery BAT reaches the upper-limit assist electric power, the control device 100 increases the driving force of the vehicle 1 by increasing the engine torque this time. Specifically, at this time, the control device 100 increases the engine torque accompanying an increase in the required driving force until the engine torque reaches an LU (lock-up) upper-limit engine torque that is determined in advance as an upper-limit value that can be output in the high-speed side engine traveling mode.

Then, when the engine torque reaches the LU upper-limit engine torque, the control device 100 determines that the required driving force is larger than the maximum driving force in the high-speed side engine traveling mode, and performs transition to the hybrid traveling mode. In the case of the example illustrated in FIG. 4, since the engine torque reaches the LU upper-limit engine torque at a time-point t12 after the time-point t11, the control device 100 is performing transition to the hybrid traveling mode at the time-point t12.

On the other hand, in the case of the example in the related art, since the upper-limit assist electric power (see FIG. 3) is lower than that in the example of the present embodiment, a timing at which the output of the battery BAT reaches the upper-limit assist electric power is advanced accordingly. In the example illustrated in FIG. 4, at a time-point t21 before the time-point t11, the output of the battery BAT reaches the upper-limit assist electric power. Therefore, in the case of the example in the related art, the engine torque is increased from the time-point t21. As a result, at a time-point t22 before the time-point t12 (that is, at an earlier timing than in the present embodiment), the engine torque reaches the LU upper-limit engine torque, and transition to the hybrid traveling mode is performed. Accordingly, in the case of the example in the related art, as compared with the present embodiment, opportunities that the vehicle 1 can travel in the high-speed side engine traveling mode are reduced, and the fuel efficiency is deteriorated.

As described above, according to the control device 100 of the present embodiment, it is possible to improve the fuel efficiency while suppressing deterioration of the NV characteristics of the vehicle 1.

The present invention is not limited to the embodiment described above, and modifications, improvements, or the like can be made as appropriate.

For example, in the above-described embodiment, two traveling modes of the high-speed side engine traveling mode and the low-speed side engine traveling mode are provided as the traveling modes in which the power of the engine ENG is transmitted to the drive wheels DW to cause the vehicle 1 to travel, but the present invention is not limited thereto. For example, only the high-speed side power transmission path may be provided so that only the high-speed side engine traveling mode can be taken as the traveling mode in which the power of the engine ENG is transmitted to the drive wheels DW to cause the vehicle 1 to travel.

In addition, although the motor assist in the high-speed side engine traveling mode is described as an example in the above-described embodiment, the present invention is not limited thereto. For example, even in the low-speed side engine traveling mode, the upper-limit assist electric power may be set in the same manner as in the high-speed side engine traveling mode of the above-described embodiment, and the motor assist may be performed using the upper-limit assist electric power as an upper-limit value. The upper-limit assist electric power set in the high-speed side engine traveling mode and the upper-limit assist electric power set in the low-speed side engine traveling mode may be different from each other.

In the present specification, at least the following matters are described. Although corresponding components and the like in the above-described embodiment are shown in parentheses, the present invention is not limited thereto.

(1) A vehicle control device (control device 100) that controls a vehicle (vehicle 1), the vehicle including: an internal combustion engine (engine ENG); a generator (generator GEN) that is driven by the internal combustion engine; a power storage device (battery BAT); an electric motor (motor MOT) that performs driving by use of supply of electric power from at least one of the generator and the power storage device; a drive wheel (drive wheels DW) that is driven by at least one of the internal combustion engine and the electric motor; and a connecting-disconnecting part (first clutch CL1, second clutch CL2) that connects/disconnects a power transmission path between the internal combustion engine and the drive wheel, in which the vehicle is capable of traveling in a plurality of traveling modes including
a first traveling mode (low-speed side engine traveling mode, high-speed side engine traveling mode) in which the power transmission path is connected by the connecting-disconnecting part and at least the internal combustion engine drives the drive wheel to cause the vehicle to travel, and
a second traveling mode (hybrid traveling mode) in which the power transmission path is disconnected by the connecting-disconnecting part and the electric motor drives the drive wheel by use of supply of electric power from at least the generator to cause the vehicle to travel, and
in which the vehicle control device
is capable of executing motor assist, in which electric power of the power storage device is supplied to the electric motor and driving of the drive wheel is assisted by the electric motor, when the vehicle is traveling in the first traveling mode, and
is configured to change upper-limit assist electric power, which is an upper-limit value of electric power supplied from the power storage device to the electric motor in order to perform the motor assist, in accordance with a speed of the vehicle and a remaining capacity of the power storage device.

According to (1), since the upper-limit assist electric power, which is the upper-limit value of the electric power supplied from the power storage device to the electric motor in order to perform the motor assist, is changed in accordance with the speed of the vehicle and the remaining capacity of the power storage device, it is possible to improve the fuel efficiency while suppressing deterioration of the NV characteristics of the vehicle.

(2) The vehicle control device according to (1),
in which the vehicle control device is configured to set predetermined upper-limit assist electric power at a time when the speed of the vehicle is a predetermined speed and the remaining capacity of the power storage device is a predetermined amount, and
in which the predetermined upper-limit assist electric power is determined such that a difference, between a rotation speed of the internal combustion engine in a case where the vehicle is caused to travel in the first traveling mode when the speed of the vehicle is the predetermined speed and the remaining capacity of the power storage device is the predetermined amount and a rotation speed of the internal combustion engine in a case where the vehicle is caused to travel in the second traveling mode when the speed of the vehicle is the predetermined speed and the remaining capacity of the power storage device is the predetermined amount, is set to be equal to or less than a predetermined allowable value.

According to (2), even if transition from the first traveling mode to the second traveling mode occurs, it is possible to suppress the deterioration of the NV characteristics of the vehicle due to a large increase in the rotation speed of the internal combustion engine accompanying the transition.

(3) The vehicle control device according to (1) or (2),
in which the upper-limit assist electric power in a case where the remaining capacity of the power storage device is small is smaller than the upper-limit assist electric power in a case where the remaining capacity of the power storage device is large.

According to (3), since the upper-limit assist electric power in the case where the remaining capacity of the power storage device is small is smaller than the upper-limit assist electric power in the case where the remaining capacity of the power storage device is large, the upper-limit assist electric power can be set appropriately according to the remaining capacity of the power storage device.

The invention claimed is:

1. A vehicle control device that controls a vehicle, the vehicle comprising: an internal combustion engine; a generator that is driven by the internal combustion engine; a power storage device; an electric motor that performs driving by use of supply of electric power from at least one of the generator and the power storage device; a drive wheel that is driven by at least one of the internal combustion engine and the electric motor; and a connecting-disconnecting part that connects and disconnects a power transmission path between the internal combustion engine and the drive wheel, wherein the vehicle is capable of traveling in a plurality of traveling modes including a first traveling mode in which the power transmission path is connected by the connecting-disconnecting part and at least the internal combustion engine drives the drive wheel to cause the vehicle to travel, and a second traveling mode in which the power transmission path is disconnected by the connecting-disconnecting part and the electric motor drives the drive wheel by use of supply of electric power from at least the generator to cause the vehicle to travel, and wherein the vehicle control device is capable of executing motor assist, in which electric power of the power storage device is supplied to the electric motor and driving of the drive wheel is assisted by the electric motor, when the vehicle is traveling in the first traveling mode, is configured to change upper-limit assist electric power, which is an upper-limit value of electric power supplied from the power storage device to the electric motor in order to perform the motor assist, in accordance with a speed of the vehicle and a remaining capacity of the power storage device, and is configured to set predetermined upper limit assist electric power at a time when the speed of the vehicle is a predetermined speed and the remaining capacity of the power storage device is a predetermined amount, wherein the predetermined upper limit assist electric power is determined such that a difference between a first rotation speed and a second rotation speed is set to be equal to or less than a predetermined allowable value, wherein the first rotation speed is a rotation speed of the internal combustion engine in a case where the vehicle is caused to travel in the first traveling mode when the speed of the vehicle is the predetermined speed and the remaining capacity of the power storage device is the predetermined amount, and wherein the second rotation speed is a rotation speed of the internal combustion engine in a case where the vehicle is caused to travel in the second traveling mode when the speed of the vehicle is the predetermined speed and the remaining capacity of the power storage device is the predetermined amount.

2. The vehicle control device according to claim 1, wherein the upper-limit assist electric power in a first case is smaller than the upper-limit assist electric power in a second case, wherein the first case is a case where the remaining capacity of the power storage device is smaller than a predetermined value, and wherein the second case is a case where the remaining capacity of the power storage device is smaller than the predetermined value.

\* \* \* \* \*